UNITED STATES PATENT OFFICE.

THOMAS J. MAYALL, OF ROXBURY, MASSACHUSETTS.

IMPROVEMENT IN MANUFACTURE OF INDIA-RUBBER HOSE.

Specification forming part of Letters Patent No. 28,388, dated May 22, 1860.

*To all whom it may concern:*

Be it known that I, THOMAS J. MAYALL, of Roxbury, in the county of Norfolk and State of Massachusetts, have invented a new and useful Process of Manufacturing India-Rubber or Gutta-Percha Hose; and I hereby declare that the following description is a full and exact specification of the same, wherein I have set forth the nature and principles of my improvements, by which my invention may be distinguished from all others of a similar class, together with such parts as I claim and desire to have secured to me by Letters Patent.

India-rubber or gutta-percha hose and tubing is ordinarily made from cotton cloth covered with a coat of vulcanized rubber or gutta-percha and wound upon a mandrel or center of the intended size of the bore of the hose. It is then vulcanized in steam-boilers or in heated ovens, or "heaters," as they are called. This method of preparing the hose is liable to many objections. In rolling up the hose air is necessarily confined between the folds, and this is expanded in the process of vulcanization, and forms bubbles, which impair the strength of the hose. The surface of the hose, when made by the old method, is rough, which allows dust to adhere to it and renders it disagreeable to use, I have invented a new and improved method of manufacturing hose and tubing which adds very materially to the strength of the hose and gives a smooth and perfect surface to it. I take a metal pipe of the intended size of the bore of the hose or tube and fold around it strips of cloth covered with a vulcanized compound of rubber or gutta-percha or strips of the same compounds prepared with fibrous materials for the purpose of giving it additional strength. After the hose is thus prepared I wrap it tightly in sheets of flexible metal. The hose is then vulcanized in any of the ordinary modes, and I take great pains in vulcanizing the hose to wrap it tightly in the sheets of flexible metal.

By this process the rubber compound which expands in the process of vulcanization is forced against the sheet of metal, and not only receives a perfectly-smooth surface, but by the great pressure forms the hose into a compact and solid mass, thus greatly increasing the strength of the hose and preventing the defects which arise from blistering the hose in the process of vulcanization.

Having thus described my improvements, I do not wish to be understood as claiming broadly the use of metallic molds as applied to the manufacture of india-rubber or gutta-percha articles, or the use of metal foil, except as applied in the manner and for the purposes hereinbefore set forth; nor do I limit myself to any particular composition of the gutta-percha or india-rubber hose, as this may be varied at pleasure; but

What I do claim as my invention, and desire to have secured to me by Letters Patent, is—

The mode of vulcanizing india-rubber or gutta-percha hose or tubing by heating the same in sheets of flexible metal, thereby gaining greater strength and a smooth surface to the hose or tubing.

THOS. J. MAYALL.

Witnesses:
JOSEPH GAVETT,
ALBERT W. BROWN.